United States Patent
Iguchi et al.

(10) Patent No.: US 9,970,716 B2
(45) Date of Patent: May 15, 2018

(54) HEAT EXCHANGER AND PRODUCTION METHOD THEREOF

(71) Applicant: NORITZ CORPORATION, Hyogo (JP)

(72) Inventors: Masahiro Iguchi, Hyogo (JP); Kazuyuki Gotou, Hyogo (JP); Hideyuki Fujisawa, Hyogo (JP); Hiroki Yamaji, Hyogo (JP); Yuta Tsuji, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 671 days.

(21) Appl. No.: 14/038,417

(22) Filed: Sep. 26, 2013

(65) Prior Publication Data

US 2014/0090827 A1    Apr. 3, 2014

(30) Foreign Application Priority Data

Sep. 29, 2012   (JP) ................................ 2012-218953

(51) Int. Cl.
    *F28F 9/18*     (2006.01)
    *F24H 1/43*     (2006.01)
    (Continued)

(52) U.S. Cl.
    CPC ............... *F28F 9/02* (2013.01); *B23P 15/26* (2013.01); *F28F 9/18* (2013.01); *F28D 7/024* (2013.01); *Y10T 29/4935* (2015.01)

(58) Field of Classification Search
    CPC ........ F28D 7/024; F28D 1/047; F28D 1/0472; F28D 1/0475; F28D 1/0477; F28F 9/18;
    (Continued)

(56) References Cited

U.S. PATENT DOCUMENTS 1,813,891 A * 7/1931 Friedman ................ F24H 1/165
                                                122/250 R
1,944,894 A * 1/1934 Kennedy ................. F24D 3/087
                                                165/163
(Continued)

FOREIGN PATENT DOCUMENTS

EP          1586841 A2 * 10/2005 ............... F28D 5/02
JP       2009-162461 A     7/2009
(Continued)

*Primary Examiner* — Grant Moubry
*Assistant Examiner* — For K Ling
(74) *Attorney, Agent, or Firm* — Studebaker & Brackett PC (57) ABSTRACT

The heat exchanger HE comprising a case 2 housing a plurality of heat transfer tubes 1 and a header 3 having a hollow main body 30 with an open edge 33. A side wall 21 of the case 2 is provided with a bulging portion 22 having a cylindrical circumferential wall 22*a* bulging out of the case 2 and an end wall 22*b* which blocks a tip portion of the circumferential wall 22*a*. Each end of the heat transfer tubes 1 is inserted into a penetrating hole 22*c* provided for the end wall 22*b* of the bulging portion 22, and is jointed to the end wall 22*b*, and the open edge 33 of the header 3 is fitted onto the circumferential wall 22*a* of the bulging portion 22, thereby forming a chamber 36 communicating with the inside of each heat transfer tube 1. Therefore, it is possible that the number of the members of the heat exchanger HE is reduced, the configuration is simplified, and the heat exchanger HE is easily manufactured at low cost.

18 Claims, 5 Drawing Sheets (51) Int. Cl.
*F28F 9/02* (2006.01)
*B23P 15/26* (2006.01)
*F28D 7/02* (2006.01)

(58) Field of Classification Search
CPC .......... F28F 9/185; F28F 9/268; F28F 9/0224;
F28F 9/0246; F28F 9/04; F28F 9/0202;
F28F 9/0219; F24H 1/52; F24H 1/523;
F24H 1/40; F24H 1/43; F24H 1/12; F24H
1/124; F24H 1/14; F24H 1/145; F24H
1/16; F24H 1/165
USPC ................ 165/143, 153, 158, 163, 176, 173
See application file for complete search history.

(56) References Cited

U.S. PATENT DOCUMENTS

| | | | | |
|---|---|---|---|---|
| 2,110,024 A * | 3/1938 | Miller | ........................ | F24F 6/04 |
| | | | | 165/110 |
| 3,203,404 A * | 8/1965 | Miller | ................... | F22B 37/107 |
| | | | | 122/236 |
| 3,207,215 A * | 9/1965 | Whittell, Jr. | ............ | F24H 1/145 |
| | | | | 165/134.1 |
| 3,563,303 A * | 2/1971 | Gilli | ........................ | F22B 37/38 |
| | | | | 165/101 |
| 4,023,618 A * | 5/1977 | Kun | .......................... | F28D 9/00 |
| | | | | 165/148 |
| 4,160,801 A * | 7/1979 | Badolato | ................. | A61M 1/32 |
| | | | | 128/DIG. 3 |
| 5,390,733 A * | 2/1995 | Young | .................... | F28F 9/0224 |
| | | | | 165/153 |
| 5,410,989 A * | 5/1995 | Kendall | .................. | F22B 31/00 |
| | | | | 122/18.4 |
| 2006/0005955 A1* | 1/2006 | Orr | ......................... | F28D 7/024 |
| | | | | 165/108 |
| 2010/0221675 A1* | 9/2010 | Rowe | ........................ | F22D 1/06 |
| | | | | 432/29 |

FOREIGN PATENT DOCUMENTS

| | | | | |
|---|---|---|---|---|
| JP | 4386491 B2 * | 12/2009 | ............... | F28D 7/16 |
| JP | 2011027363 A * | 2/2011 | | |
| JP | 2012-002464 A | 1/2012 | | |

* cited by examiner

HEAT EXCHANGER AND PRODUCTION METHOD THEREOF

BACKGROUND OF THE INVENTION

Field of the Invention

The present invention relates to a heat exchanger that a plurality of heat transfer tubes are housed in a case and to a production method of the heat exchanger.

Description of the Related Art

One example of a heat exchanger is disclosed in Patent Literature 1.

The heat exchanger disclosed in Patent Literature 1 is bulged out of a part of the side wall of the case that a plurality of heat transfer tubes are housed inside and the bulging portion constitutes a header for entering water or delivering heated water. A practical means for utilizing the bulging portion as the header is an auxiliary member through which the ends of the heat transfer tubes are designed to penetrate. The auxiliary member is jointed in the bulging portion and separates the inside of the bulging portion from the inside of the case.

In such a configuration, the header is integrally provided with the side wall of the case, thereby being capable of reducing the number of members and downsizing the apparatus. The bulging portion bulges out of the case, thereby avoiding such a disadvantage that arrangement of the heat transfer tube is largely restricted because of a reduced space in the case; for example, unlike the heat exchanger disclosed in Patent Literature 2.

However, there is still a room for improvement in the conventional art as mentioned below.

The auxiliary member is required to be jointed in the bulging portion and the jointing portion is to be positioned in the case. Therefore, it is difficult to use welding as a jointing means of the jointing portion and brazing is required. However, brazing needs large equipment such as a vacuum furnace, thereby increasing the facility cost. As a result, the production cost of the heat exchanger also increases. In addition, when brazing is executed in the case, it is difficult to check whether brazing is appropriately done or not, thereby quality control becomes difficult.

Conventionally, some heat exchangers are capable of being manufactured by welding, unlike Patent Literature 1. However, such a heat exchanger comprises a number of members and has a complicated structure. Therefore, the production cost of such a heat exchanger becomes high.

CITATION LIST

Patent Literature 1: Japanese unexamined patent publication 2012-2464
Patent Literature 2: Japanese unexamined patent publication 2009-162461

SUMMARY OF THE INVENTION

An object of the present invention is to provide a heat exchanger capable of resolving or reducing the above-mentioned disadvantages and to provide a production method of the heat exchanger.

The present invention proposes the following technical means for solving the above-mentioned problems.

A heat exchanger proposed by the first aspect of the present invention comprises a plurality of heat transfer tubes, a case having at least one side wall and housing the heat transfer tubes, and a header for entering water into the heat transfer tubes or delivering heated water from the heat transfer tubes. The side wall of the case is provided with a bulging portion having a cylindrical circumferential wall bulging out of the case and an end wall which blocks a tip portion of the circumferential wall and has a plurality of penetrating holes. Ends of the heat transfer tubes are inserted into the penetrating holes, respectively, and are jointed with the end wall. The header has a hollow main body having an open edge forming an opening corresponding to the bulging portion, and the opening of the header is blocked by the end wall by fitting the open edge onto the circumferential wall, thereby a chamber communicating with the heat transfer tubes is formed in the header.

Preferably, the side wall of the case is constituted with a metal plate, and the bulging portion is integrally formed with the side wall by press-working, and the circumferential wall of the bulging portion and the end wall of the bulging portion are integrally connected.

Preferably, the circumferential wall of the bulging portion has a portion inclining in such a manner that an external dimension of the bulging portion is gradually reduced toward a tip side, a tip of the open edge of the header abuts an outer surface of the inclined portion, and the header and the bulging portion are jointed at the abutting portion.

Preferably, outer circumference of the open edge of the header is integrally formed with a flange projecting out of the open edge, and the header and the bulging portion are jointed by welding the flange to an outer surface of the circumferential wall.

Preferably, a portion closer to the tip of the circumferential wall of the bulging portion than the inclined portion is a non-inclined portion of which external dimension is substantially fixed along the axial direction of the circumferential wall, and the open edge of the header is fitted onto the non-inclined portion.

Preferably, outer circumference of the open edge of the header is integrally formed with a flange projecting out of the open edge.

Preferably, the header and the bulging portion are jointed by welding the flange to the outer surface of the circumferential wall.

Preferably, an inner circumferential surface of the open edge corresponding to a base of the flange is a convexly curved surface having a predetermined curvature radius, and the curved surface abuts the outer surface of the inclined portion.

Preferably, the circumferential wall has a pair of substantially semi-cylindrical end areas in horizontal direction at both ends of the circumferential wall and has a pair of middle areas in vertical direction between the end areas so as to connect the end areas, an upper one of the middle areas curves so as to expand upward, and a lower one curves so as to expand downward.

Preferably, a joint tube body communicating with the chamber is adapted to project out of an outer surface of the main body of the header.

Preferably, the heat transfer tubes have a plurality of helical tube bodies having different winding diameters and being arranged to be wound and overlapped in a substantially concentric manner, and have a plurality of straight tube bodies connected with ends of the helical tube bodies, respectively, and the ends of the straight tube bodies are inserted into the penetrating holes, respectively.

Preferably, the case is substantially a cuboid having a supply port and a discharge port of heating gas for the heat transfer tubes and the heating gas in the case from the supply port flows so as to contact the outer surfaces of the heat transfer tubes and reaches the discharge port.

A production method of the heat exchanger proposed by the second aspect of the preset invention is a method for producing the heat exchanger proposed by the first aspect of the present invention. The heat exchanger comprises a plurality of heat transfer tubes, a side wall of a case, the side wall constituting a part of the case housing the heat transfer tubes and being provided with a bulging portion having a cylindrical circumferential wall bulging out of the case and an end wall which blocks a tip portion of the circumferential wall and has a plurality of penetrating holes, and a header provided with a hollow main body having an open edge forming an opening corresponding to the bulging portion. The method comprises a first step for inserting ends of the heat transfer tubes into the penetrating holes, respectively and welding the ends to the end wall of the bulging portion, and a second step for fitting the open edge of the header onto the circumferential wall of the bulging portion and welding the open edge to the side wall of the case.

Preferably, the circumferential wall of the bulging portion is provided in advance with a portion inclining in such a manner that an external dimension of the bulging portion is gradually reduced toward the tip side, a tip of the open edge of the header is abutted to an outer surface of the inclined portion, and the header and the bulging portion are welded at the abutting portion in the second step.

Preferably, outer circumference of the open edge of the header is integrally formed in advance with a flange projecting out of the open edge, and jointing of the header and the bulging portion is executed by welding the flange to an outer surface of the circumferential wall.

Preferably, a portion closer to the tip of the circumferential wall of the bulging portion than the inclined portion forms in advance a non-inclined portion of which external dimension is substantially fixed along the axial direction of the circumferential wall, and the open edge of the header is fitted onto the non-inclined portion in the second step.

Preferably, the outer circumference of the open edge of the header is integrally formed in advance with a flange projecting out of the open edge, and jointing of the header and the bulging portion is executed by welding the flange to the outer surface of the circumferential wall.

Preferably, an inner circumferential surface of the open edge corresponding to a base of the flange forms in advance a convexly curved surface having a predetermined curvature radius, and the curved surface is abutted to the outer surface of the inclined portion when the open edge is abutted to the inclined portion.

Other characteristics and advantages of the present invention will be apparent in the following detailed description of the preferred embodiments referring to the attached drawings.

DETAILED DESCRIPTION OF THE PREFERRED EMBODIMENT

Preferred embodiments of the present invention are explained below with reference to the accompanying drawings.

Figure 1:
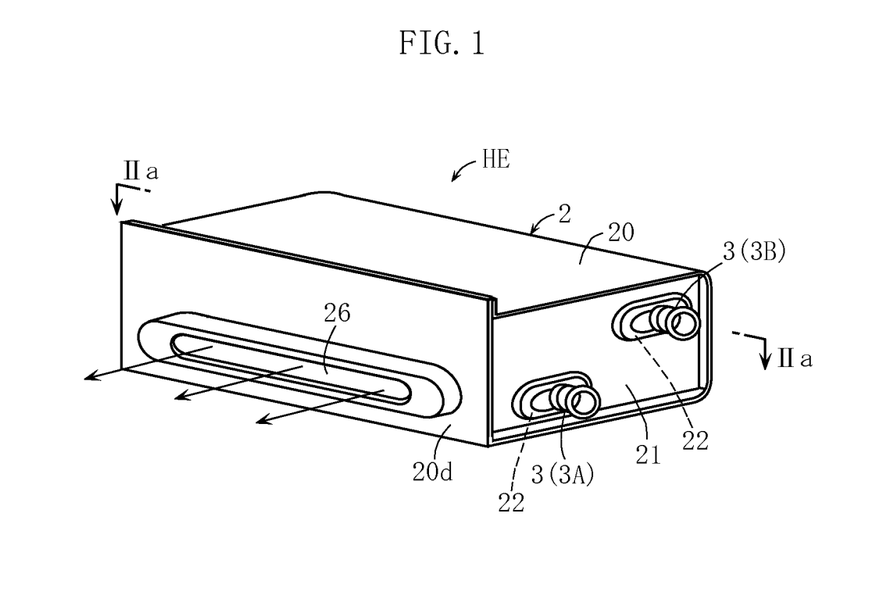
FIG. 1 is an externally perspective view showing one example of a heat exchanger of the present invention.
Figure 2A:
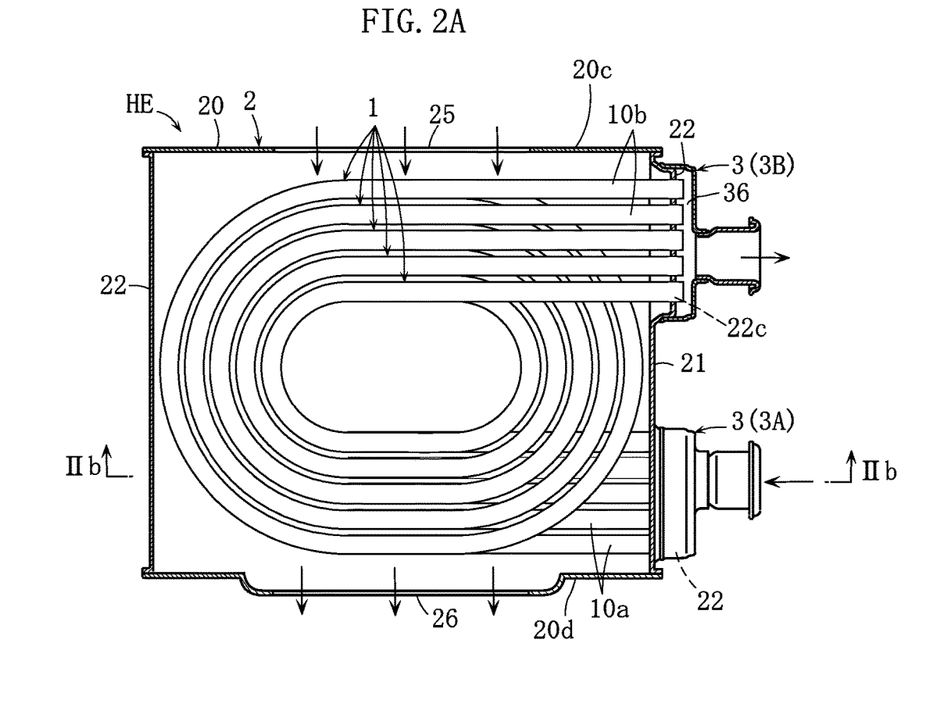
FIG. 2A is a sectional view along the line IIA to IIA in FIG. 1
Figure 2B:
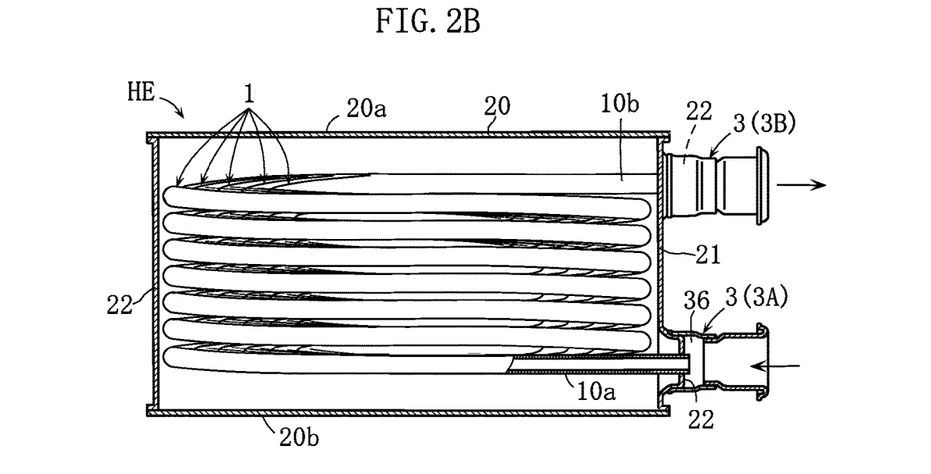
FIG. 2B is a sectional view along the line IIB to IIB in FIG. 2A.

A heat exchanger HE shown in FIG. 1, FIG. 2A and FIG. 2B is preferably used for heating water by recovering heat from combustion gas generated by a burner (not shown) such as a gas burner and is used, for example, as a heat exchanger provided for a water heater for recovering latent heat.

The heat exchanger HE has a case 2, a plurality of heat transfer tubes 1 housed in the case 2, and a pair of headers 3 (3A, 3B) connected to lower ends and upper ends of the heat transfer tubes 1 for entering water and for delivering heated water, respectively.

A plurality of heat transfer tubes 1 have a plurality of helical tube bodies in the form of an ellipse as seen in plan view. The helical tube bodies have different winding diameters and are arranged to be wound and overlapped in a substantially concentric manner. Straight tube bodies 10a, 10b extending almost horizontally are integrally connected to lower portions and upper portions of the helical tube bodies, respectively. In FIG. 2B an upper gap and a lower gap of the heat transfer tubes 1 in the case 2 are large; however, the gaps are preferably made as small as possible. For reducing the gaps, a stepped portion (not shown) projecting toward the heat transfer tubes 1 is provided for an upper wall 20a and a lower wall 20b, respectively.

The case 2, like a cuboid, has a main body 20 (rectangle-tubular stem body) and a pair of side walls 21, 22. The main body 20 and the side walls 21, 22 are constituted with metal plates such as stainless steel. A rear wall 20c and a front wall 20d of the case 2 are provided with an inlet port 25 and an outlet port 26 of combustion gas, respectively. Combustion gas entered in the case 2 from the inlet port 25 passes through gaps between a plurality of heat transfer tubes 1 and reaches the outlet port 26. In the procedure, heat is recovered from combustion gas by each heat transfer tube 1 and water in each heat transfer tube 1 is heated.

The side wall 21 of the case 2 is formed with two bulging portions 22. Each bulging portion 22 is formed by press-working the side wall 21. As shown in FIG. 3A to FIG. 3C, FIG. 4A, and FIG. 4B, each bulging portion 22 has a cylindrical circumferential wall 22a bulging out of the case 2 and an end wall 22b blocking a tip portion of the circumferential wall 22a. The circumferential wall 22a and the end wall 22b are integrally connected. A plurality of heat transfer tubes 1 are inserted into a plurality of penetrating holes 22c provided for the end wall 22b, respectively, and are welded to the end wall 22*b*. When the end of each heat transfer tube 1 is welded while penetrating the end wall 22*b* and projecting out of the case 2 (as shown in the figures), the end melts instead of a welding rod and becomes substantially flush with the end wall 22*b*.

Figure 5:
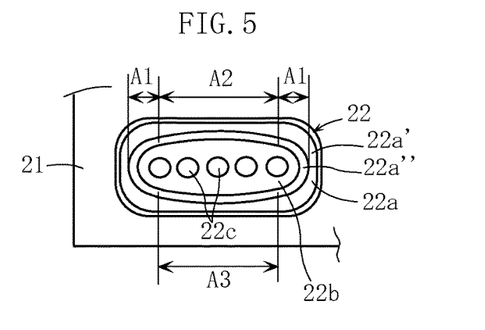
FIG. 5 is a front view of the substantial part of the bulging portion provided for the heat exchanger shown in FIG. 1.

The circumferential wall 22*a* of the bulging portion 22 has a portion 22*a'* inclining such that the external dimension of the circumferential wall 22*a* is gradually reduced toward a tip side of the bulging portion 22, and has a non-inclined portion 22*a"* connected to the tip portion of the inclined portion 22*a'*. In the non-inclined portion 22*a"*, external dimension of the circumferential wall 22*a* is constant in the axial direction (bulging direction) of the bulging portion 22. The shape of the bulging portion 22 as seen in front is shown, for example, in FIG. 5. As shown in FIG. 5, the circumferential wall 22*a* of the bulging portion 22 has a pair of substantially semi-cylindrical end areas A1 in the horizontal direction at both ends of the circumferential wall 22*a* and has a pair of middle areas A2, A3 in the vertical direction between the end areas A1 so as to connect the end areas A1. The upper middle area A2 curves upward and the lower middle area A3 curves downward. The functions are explained later.

The header 3 is constituted with a separate member from the side wall 21. As shown in FIG. 3A to FIG. 3C and FIG. 4A and FIG. 4B, the header 3 has a hollow main body 30 having on the front side an open edge 33 forming an opening 32 corresponding to the bulging portion 22, and has a joint tube body 31 connected to the rear side of the main body 30. A flange 34 is integrally formed with the outer circumference of the open edge 33, the flange 34 being short and projecting out of the open edge 33. The inner circumference of the tip of the open edge 33 (inner circumference corresponding to the base of the flange 34) forms a convexly curved surface 35 with an appropriate curvature radius Ra.

Figure 3A:
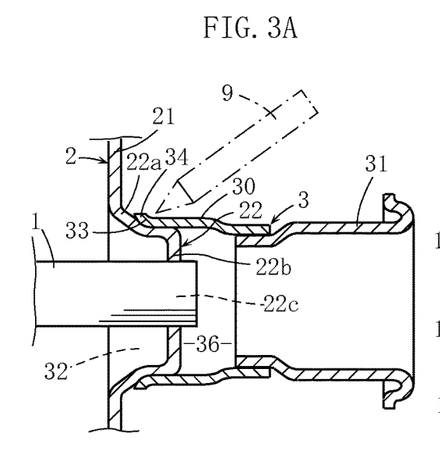
FIG. 3A is an enlarged sectional view of the substantial part of FIG. 2B.
Figure 3B:
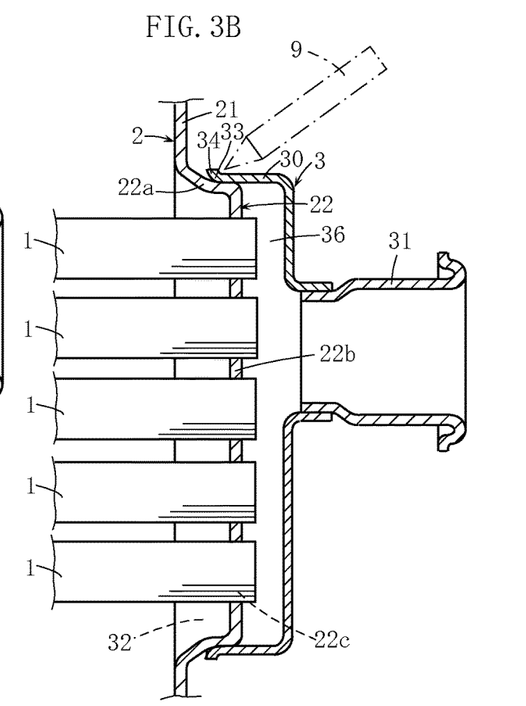
FIG. 3B is a plan sectional view of FIG. 3A.
Figure 3C:
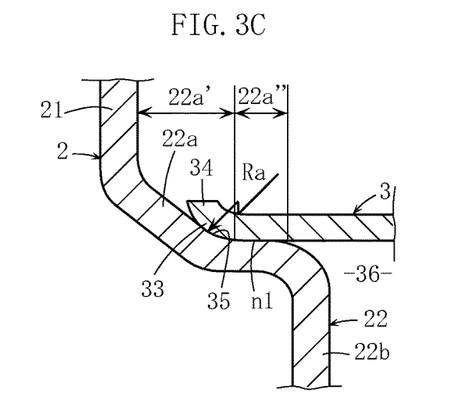
FIG. 3C is an enlarged sectional view of the substantial part of FIG. 3A

The open edge 33 of the header 3 is fitted onto the circumferential wall 22*a* of the bulging portion 22. More particularly, the open edge 33 is fitted onto the non-inclined portion 22*a"* of the circumferential wall 22*a*. The curved surface 35 of the inner circumference of the tip of the open edge 33 abuts the outer surface of the inclined portion 22*a'* of the circumferential wall 22*a*. Welding is executed on the abutting portion for jointing the header 3 and the bulging portion 22. When the header 3 is fitted onto the bulging portion 22, the opening 32 of the header 3 is closed by the end wall 22*b* of the bulging portion 22. Therefore, an area out of the end wall 22*b* of the case 2 in the header 3 constitutes a chamber 36 for flowing water communicating in each heat transfer tube 1.

The above-mentioned heat exchanger HE is manufactured, for example, by the following procedures.

A plurality of heat transfer tubes 1, the case 2, and the header 3 which are mentioned above are prepared.

Figure 7A:
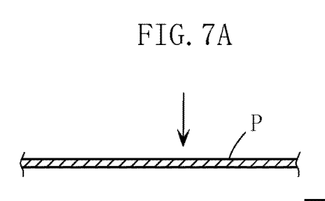
FIG. 7A to FIG. 7C are sectional views diagrammatically showing production procedures of the header of the heat exchanger shown in FIG. 1.
Figure 7B:
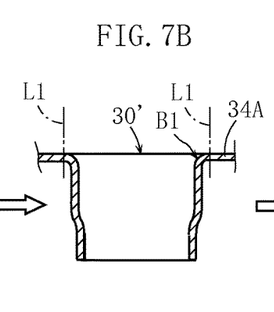
Figure 7C:
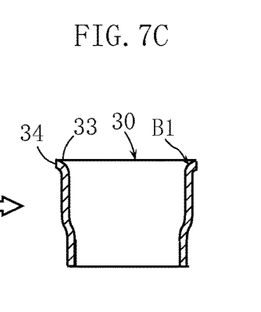

The main body 30 of the header 3 is manufactured, for example, by the procedures shown in FIG. 7A to FIG. 7C. Firstly, a flat metal plate P, raw material, is subjected to deep drawing as shown in FIG. 7A. Then, an intermediate product 30' of a header connected to a flat plate portion 34A is formed as shown in FIG. 7B. Next, the flat plate portion 34A is punched out in a circular shape at a position of a virtual line L1 shown in FIG. 7B. Then, the main body 30 of the header 3 having the short flange 34 is manufactured as shown in FIG. 7C. The header 3 is completed by welding the joint tube body 31 to the main body 30.

Figure 8:
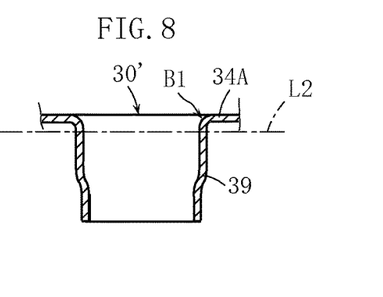
FIG. 8 is a sectional view showing an example compared with the procedures shown in FIG. 7.

FIG. 8 shows an example compared with that of FIG. 7A to FIG. 7C. In the production method of FIG. 8, the intermediate product 30' of a header is cut at a virtual line L2 and a header of which flat plate portion 34A is entirely removed is formed. A boundary B1 between a portion 39 formed by deep drawing and the flat plate portion 34A is able to obtain high dimension accuracy. However, in the production method of FIG. 8, the header does not have such a boundary. On the other hand, in the production method shown in FIG. 7A to FIG. 7C, the header 3 having the boundary B1 with high dimension accuracy is obtained. However, in the present invention, the header manufactured by the method shown in FIG. 8 can be used.

Figure 4A:
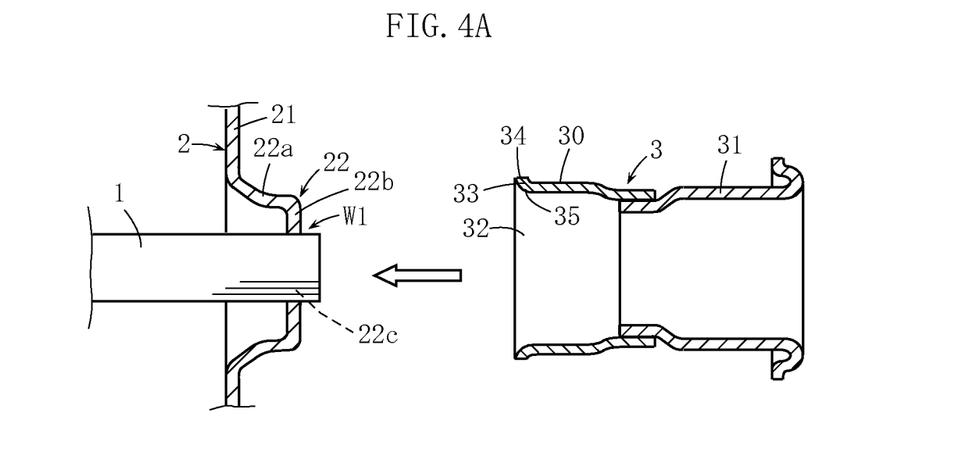
FIG. 4A and FIG. 4B are exploded sectional views of the structure shown in FIGS. 3A and FIG. 3B, respectively.
Figure 4B:
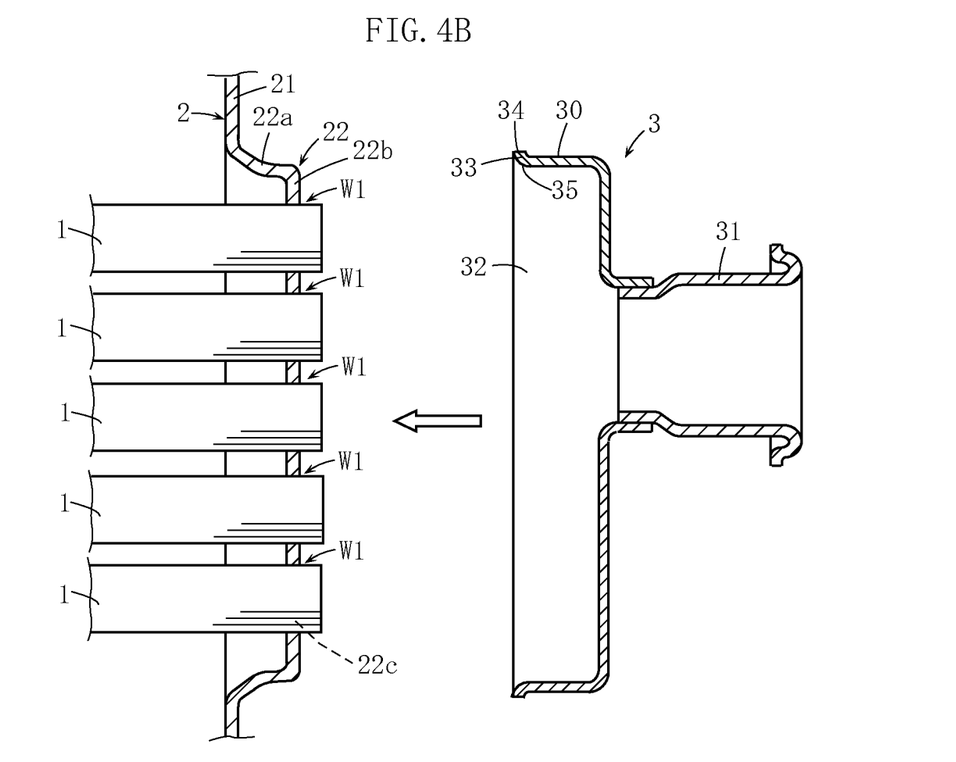

For assembling the heat exchanger HE, as shown in FIG. 4A and FIG. 4B, firstly a plurality of heat transfer tubes 1 are penetrated through the bulging portion 22 of the side wall 21 of the case 2. Each end of the heat transfer tubes 1 is pulled out of the side wall 21. Then, the entire circumference of a part of each heat transfer tube 1 neighboring the end wall 22*b* is welded to the end wall 22*b*. The welding is able to be executed outside the side wall 21 (outside the case 2) as shown with the reference numeral W1. In such a case, the end of the heat transfer tube 1 is able to be utilized as a welding rod as mentioned above.

Next, the open edge 33 of the header 3 is fitted onto the circumferential wall 22*a* of the bulging portion 22. Then, as shown in FIG. 3A and FIG. 3B the entire circumference of the open edge 33 is TIG welded to the circumferential wall 22*a* using, for example, a TIG welding torch 9. This welding is also able to be executed outside the case 2. A series of procedures as mentioned above are able to be executed while the side wall 21 does not joint the main body 20 of the case 2. After welding the header 3 to the side wall 21, the side wall 21 is assembled to the side of the main body 20 in such a manner that a plurality of heat transfer tubes 1 are housed in the main body 20 of the case 2. In case of such assembly, the side wall 21 is fitted to a side opening of the main body 20 and the fitted portion is welded. Of course, unlike such an assembly procedure, after the side wall 21 is assembled to the main body 20, the header 3 can be assembled to the bulging portion 22 of the side wall 21.

The preferred embodiments of the present invention have the following operational effects.

As mentioned above, each member is easily jointed by a welding means when the heat exchanger HE is assembled. Therefore, equipment for brazing is not required. Welding is able to be executed outside the case 2, thereby facilitating confirmation operation whether the joint is appropriate or not. On the other hand, the number of the members of the heat exchanger HE is reduced and the entire structure is simplified. The header 3 is assembled to the bulging portion 22 by a fitting method, thereby improving assembly efficiency. Therefore, the production cost of the heat exchanger HE is able to be reduced.

For fitting the header 3 onto the circumferential wall 22*a* of the bulging portion 22, the circumferential wall 22*a* is provided with the tapered inclined portion 22*a'* and the outer surface is abutted with the open edge 33 of the header 3. In such a configuration, the tip of the open edge 33 is able to be positively pushed against the outer surface of the inclined portion 22*a'*. The area where the open edge 33 abuts the inclined portion 22*a'* (the boundary B1 between the flat plate portion 34A and the main body 30) has high dimension accuracy as explained referring to FIG. 7. The inner circumferential surface of the area is the curved surface 35 having a predetermined curvature radius Ra. Therefore, the curved portion 35 is able to tightly contact the outer surface of the inclined portion 22*a'* without any gap. The open edge 33 is provided with the short flange 34, so that the flange 34 is able to be used as a welding rod in case of TIG welding to the open edge 33. Therefore, the open edge 33 and the circumferential wall 22a of the bulging portion 22 are able to be jointed under highly sealed condition without any gap. Therefore, such a configuration is preferable for surely preventing leakage of water in the chamber 36. In addition, the inclined portion 22' is provided, so that the welding position of the header 3 and the circumferential wall 22 is controlled to be arranged apart from a flat portion of the side wall 21 (where the bulging portion 22 is not provided). Thus, comparing with the case when the inclined portion 22' is not provided, thermal influence on the flat portion during welding is inhibited, thereby preferably avoiding distortion of the side wall 21.

The circumferential wall 22a of the bulging portion 22 is provided with the inclined portion 22a' as mentioned above. When the inclined portion 22a' is provided, the non-inclined portion 22a" (width in the horizontal direction in FIG. 3C) is able to be shortened by the length of the inclined portion 22', and the fitting dimension of the bulging portion 22 and the header 3 is able to be reduced. The fitting portion between the bulging portion 22 and the header 3 causes a minute gap therebetween (portion shown with the reference numeral n1). The fitting portion easily causes "crevice corrosion" because water in the chamber 36 flows in and retains therein. On the other hand, in the embodiment of the present invention, the dimension of the non-inclined portion 22a" is reduced and it is possible that the gap which causes "crevice corrosion" is not formed in wide area.

Figure 6:
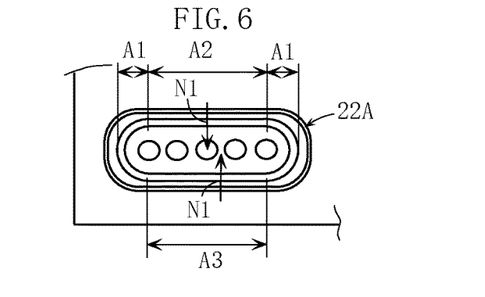
FIG. 6 is a front view of the substantial part showing an example compared with the structure shown in FIG. 5.

As explained referring to FIG. 5, the circumferential wall 22a of the bulging portion 22 curves in such a manner that a pair of end areas A1 in the horizontal direction and a pair of middle areas A2, A3 in the vertical direction bulge outward (up and down). Therefore, when the open edge 33 of the header 3 is fitted onto the circumferential wall 22a and force is applied, the circumferential wall 22a is inhibited to be inappropriately deformed. FIG. 6 shows an example compared with the embodiment of the present invention. A pair of vertical middle areas A2, A3 of a bulging portion 22A in FIG. 6 are straight as seen in front view. In such a configuration, when force is applied to the bulging portion 22A, the middle areas A2, A3 dent inward (in the direction of the arrow N1) and easily deform. The areas A2, A3 become wavy in case of assembling the header 3, thereby there is a fear of inappropriate welding. On the other hand, in the embodiment of the present invention as shown in FIG. 5, it is possible to reduce the possibility of such disadvantages. However, in the present invention, the configuration of bulging portion 22A shown in FIG. 6 can be used.

In the above-mentioned embodiment, welding is used as a joint means, but brazing can be used. In case of brazing, the flange 34 is used as a guide of brazing material, thereby improving application ability of brazing material. In addition, in case of brazing, the intensity of the header 3 is able to be improved.

The present invention is not limited to the above-mentioned preferred embodiments. The specific configuration of the members of the heat exchanger of the present invention is freely designed within the intended scope of the present invention. The specific procedure of the production method of the heat exchanger of the present invention is also freely diversified.

The specific bulging dimension of the bulging portion of the present invention is not limited as long as the bulging portion has the cylindrical circumferential wall bulging out of the side wall of the case toward the outside of the case and the end wall blocking the tip portion of the circumferential wall. The heat transfer tube is not limited to a helical tubular body and can be several kinds of heat transfer tubes (for example, a straight tube, a U-shaped tube, or a meandering flexible tube).

When a plurality of headers are provided for the heat exchanger in the present invention, it is preferable that all of the headers are configured as intended in the present invention; however, the present invention is not limited to such a configuration. If some of the headers are configured as intended in the present invention and other headers are not configured as intended in the present invention, such a configuration is included in the technical scope of the present invention. Heating gas flowing in the case includes gas other than combustion gas (for example, discharge gas of cogeneration system). The heat exchanger of the present invention is not limited to be used for recovering latent heat but is able to be used for recovering sensible heat.

The invention claimed is:

1. A heat exchanger comprising:
a plurality of heat transfer tubes;
a case having a main body and at least one side wall which blocks an opening of an end of the main body, the case housing the heat transfer tubes; and
a pair of headers, each of the headers being configured to enter water into the heat transfer tubes or to deliver heated water from the heat transfer tubes,
wherein
the side wall of the case is partially provided with a pair of bulging portions, each of the bulging portions being formed on a part of the side wall which departs from a joined portion of a peripheral portion of the side wall and the main body, each of the bulging portions having a cylindrical circumferential wall bulging out of the case and an end wall which is integrally connected to the cylindrical circumferential wall so as to block a tip portion of the cylindrical circumferential wall and has a plurality of penetrating holes,
the cylindrical circumferential wall and the end wall are integrally provided with the side wall, and the part of the side wall is bulged from another area of the side wall,
ends of the heat transfer tubes are inserted into the penetrating holes, respectively, and are joined with the end wall, and
each of the headers has a hollow main body having an open edge forming an opening corresponding to each of the bulging portions and the opening is blocked by the end wall by fitting the open edge onto the cylindrical circumferential wall, thereby a chamber communicating with the heat transfer tubes is formed in each of the headers.

2. The heat exchanger as set forth in claim 1, wherein the side wall of the case is constituted with a metal plate, and each of the bulging portions is integrally formed with the side wall by press-working, and the circumferential wall of each of the bulging portions and the end wall of each of the bulging portions are integrally connected.

3. The heat exchanger as set forth in claim 1, wherein the circumferential wall of each of the bulging portions has a portion inclining in such a manner that an external dimension of each of the bulging portions is gradually reduced toward the tip side, and
a tip of the open edge of each of the headers abuts an outer surface of the inclined portion, and each of the headers and the bulging portions are joined at the abutting portion.

4. The heat exchanger as set forth in claim 3, wherein an outer circumference of the open edge of each of the headers is integrally formed with a flange projecting out of the open edge, and each of the headers and each of the bulging portions are joined by welding the flange to an outer surface of the circumferential wall.

5. The heat exchanger as set forth in claim 3, wherein a portion closer to the tip of the circumferential wall of each of the bulging portions than the inclined portion is a non-inclined portion of which external dimension is substantially fixed along the axial direction of the circumferential wall, and the open edge of each of the headers is fitted onto the non-inclined portion.

6. The heat exchanger as set forth in claim 5, wherein an outer circumference of the open edge of each of the headers is integrally formed with a flange projecting out of the open edge.

7. The heat exchanger as set forth in claim 6, wherein each of the headers and the bulging portions are joined by welding the flange to the outer surface of the circumferential wall.

8. The heat exchanger as set forth in claim 6, wherein an inner circumferential surface of the open edge corresponding to a base of the flange is a convexly curved surface having a predetermined curvature radius, and the curved surface abuts the outer surface of the inclined portion.

9. The heat exchanger as set forth in claim 1, wherein the circumferential wall has a pair of substantially semi-cylindrical end areas in horizontal direction at both ends of the circumferential wall and has a pair of middle areas in vertical direction between the end areas so as to connect the end areas, and an upper one of the middle areas curves so as to expand upward and a lower one curves so as to expand downward.

10. The heat exchanger as set forth in claim 1, wherein a joint tube body communicating with the chamber projects out of an outer surface of the main body of each of the headers.

11. The heat exchanger as set forth in claim 1, wherein the heat transfer tubes have a plurality of helical tube bodies having different winding diameters and being arranged to be wound and overlapped in a substantially concentric manner, and have a plurality of straight tube bodies connected with ends of the helical tube bodies, respectively, and the ends of the straight tube bodies are inserted into the penetrating holes, respectively.

12. The heat exchanger as set forth in claim 1, wherein the case has a supply port and a discharge port of heating gas for the heat transfer tubes and the heating gas in the case from the supply port flows so as to contact the outer surfaces of the heat transfer tubes and reaches the discharge port.

13. A production method of the heat exchanger as set forth in claim 1, wherein the heat exchanger comprises:

a plurality of heat transfer tubes, a case having a main body and at least one side wall which blocks an opening of an end of the main body, the case housing the heat transfer tubes, and a pair of headers, each of the headers being configured to enter water into the heat transfer tubes or to deliver heated water from the heat transfer tubes, wherein the side wall of the case is partially provided with a pair of bulging portions, each of the bulging portions being formed on a part of the side wall which departs from a joined portion of a peripheral portion of the side wall and the main body, each of the bulging portions having a cylindrical circumferential wall bulging out of the case and an end wall which is integrally connected to the cylindrical circumferential wall so as to block a tip portion of the cylindrical circumferential wall and has a plurality of penetrating holes, the cylindrical circumferential wall and the end wall are integrally provided with the side wall, and the part of the side wall is bulged from another area of the side wall, ends of the heat transfer tubes are inserted into the penetrating holes, respectively, and are joined with the end wall, and each of the headers has a hollow main body having an open edge forming an opening corresponding to each of the bulging portions and the opening is blocked by the end wall by fitting the open edge onto the cylindrical circumferential wall, thereby a chamber communicating with the heat transfer tubes is formed in each of the headers, and wherein the method comprises:

a first step for inserting the ends of the heat transfer tubes into the penetrating holes, respectively, and welding the ends to the end wall, and a second step for fitting the open edge of each of the headers onto the cylindrical circumferential wall and welding the open edge to the side wall of the case.

14. The production method as set forth in claim 13, wherein the circumferential wall is provided in advance with a portion inclining in such a manner that an external dimension of the bulging portion is gradually reduced toward the tip side, and a tip of the open edge of each of the headers is abutted to an outer surface of the inclined portion, and the header and the bulging portion are welded at the abutting portion in the second step.

15. The production method as set forth in claim 14, wherein an outer circumference of the open edge of each of the headers is integrally formed in advance with a flange projecting out of the open edge, and jointing of the header and the bulging portion is executed by welding the flange to an outer surface of the circumferential wall.

16. The production method as set forth in claim 14, wherein a portion closer to the tip of the circumferential wall than the inclined portion forms in advance a non-inclined portion of which external dimension is substantially fixed along the axial direction of the circumferential wall, and the open edge of each of the headers is fitted onto the non-inclined portion in the second step.

17. The production method as set forth in claim 16, wherein the outer circumference of the open edge of each of the headers is integrally formed in advance with a flange projecting out of the open edge, and jointing of the header and the bulging portion is executed by welding the flange to the outer surface of the circumferential wall.

18. The production method as set forth in claim 17, wherein an inner circumferential surface of the open edge corresponding to a base of the flange forms in advance a convexly curved surface having a predetermined curvature radius, and the curved surface is abutted to the outer surface of the inclined portion when the open edge is abutted to the inclined portion.

* * * * *